United States Patent [19]
Oosterkamp et al.

[11] Patent Number: 5,276,720
[45] Date of Patent: Jan. 4, 1994

[54] EMERGENCY COOLING SYSTEM AND METHOD

[75] Inventors: Willem J. Oosterkamp, Oosterbeek, Netherlands; Yee K. Cheung, San Jose, Calif.

[73] Assignee: General Electric Company, San Jose, Calif.

[21] Appl. No.: 970,504

[22] Filed: Nov. 2, 1992

[51] Int. Cl.⁵ .............................................. G21C 15/18
[52] U.S. Cl. ...................................... 376/283; 376/299
[58] Field of Search .................. 376/282, 283, 298, 299

[56] References Cited

U.S. PATENT DOCUMENTS

| 5,059,385 | 10/1991 | Gluntz et al. | 376/283 |
| 5,082,619 | 1/1992 | Sawyer | 376/283 |
| 5,098,646 | 3/1992 | Oosterkamp | 376/283 |

*Primary Examiner*—Daniel D. Wasil
*Attorney, Agent, or Firm*—J. S. Beulick

[57] ABSTRACT

An improved emergency cooling system and method is disclosed that may be adapted for incorporation into or use with a nuclear BWR wherein a reactor pressure vessel (RPV) containing a nuclear core and a heat transfer fluid for circulation in a heat transfer relationship with the core is housed within an annular sealed drywell and is fluid communicable therewith for passage thereto in an emergency situation the heat transfer fluid in a gaseous phase and any noncondensibles present in the RPV, an annular sealed wetwell houses the drywell, and a pressure suppression pool of liquid is disposed in the wetwell and is connected to the drywell by submerged vents. The improved emergency cooling system and method has a containment condenser for receiving condensible heat transfer fluid in a gaseous phase and noncondensibles for condensing at least a portion of the heat transfer fluid. The containment condenser has an inlet in fluid communication with the drywell for receiving heat transfer fluid and noncondensibles, a first outlet in fluid communication with the RPV for the return to the RPV of the condensed portion of the heat transfer fluid and a second outlet in fluid communication with the drywell for passage of the noncondensed balance of the heat transfer fluid and the noncondensibles. The noncondensed balance of the heat transfer fluid and the noncondensibles passed to the drywell from the containment condenser are mixed with the heat transfer fluid and the noncondensibles from the RPV for passage into the containment condenser. A water pool is provided in heat transfer relationship with the containment condenser and is thermally communicable in an emergency situation with an environment outside of the drywell and the wetwell for conducting heat transferred from the containment condenser away from the wetwell and the drywell.

30 Claims, 2 Drawing Sheets

EMERGENCY COOLING SYSTEM AND METHOD

BACKGROUND OF THE INVENTION

The Government has rights in this invention under contract No. DE-AC03-90SF18494.

The present invention relates to nuclear boiling water reactors (BWRs) and more particularly to their containment in the event of a malfunction.

During normal operation of a nuclear BWR, steam is generated from either a forced- or a natural-circulation of coolant water in heat transfer relationship with the nuclear fuel housed within a reactor pressure vessel (RPV). The nuclear fuel consists of fuel rods which develop substantial internal heat from the fission of a radioactive material, such as uranium or the like. Even after shutdown of the reactor in the normal course of operation or in the event of an emergency situation, decay reactions occurring in the fuel rods continue to generate heat for an extended period of time. Removal of this decay heat is necessary to maintain the structural integrity of the RPV, but must be effected without releasing radioactive steam or water to the environment.

The most serious emergency situation requiring reactor shutdown is generally perceived to be a rupture of the RPV or of a major coolant line connected to the vessel, either resulting in what is known as a loss of coolant accident (LOCA). Another emergency situation which may require only a reduction in heat generation and not a total shutdown of the reactor occurs in connection with the driving of an electric generator with a turbine powered by the steam generated in a BWR. An electric generator can experience a sudden loss of load. Attendant therewith is a concomitant reduction in demand for steam at a rate that exceeds the ability of the reactor control system and the normal cooling system to accommodate. In either of the emergency situations described, the decay or excess heat must be dissipated from the reactor without the release of radioactive materials to the environment.

To prevent the release of radioactive products in emergency situations, the RPV typically is placed within a series of containment structures known as primary and secondary containment vessels. The primary containment vessel consists of a drywell and a wetwell. The drywell contains the reactor and the coolant recirculation pumps and in more recent BWRs is a concrete cylinder with a domed top. The wetwell commonly is an annular chamber in which a pool of water is retained by an interior rear wall and by the primary containment vessel. During a LOCA, the steam released by the flashing of the coolant water is forced into the water of the wetwell and condensed, thereby lowering the temperature and pressure of the drywell atmosphere. For this reason, the wetwell is commonly referred to as the pressure suppression pool. Connection between the drywell and the wetwell generally is provided by a number of horizontal cylindrical vents in the lower part of the drywell wall. A reinforced concrete shield building usually constitutes the secondary containment vessel.

To remove the decay or excess heat from the reactor after a LOCA, there is normally provided within the secondary containment vessel a containment condenser disposed in a water pool heat sink for receiving and condensing excess steam from the reactor and containment until the decay heat of the fuel rods is dissipated. The water pool heat sink is commonly opened to the atmosphere so that the specific and latent heat of the steam condensed can be removed from the reactor. However, the radioactive steam and condensate themselves must remain inside the reactor containment vessels for environmental reasons.

Although long-term heat removed is assured by the containment condenser, the condenser requires some bleeding to the wetwell to remove non-condensable gases that can otherwise accumulate in the containment condenser and deleteriously effect heat transfer. Thus, a bleedline from the containment condenser to the wetwell is provided. The outlet of this bleedline must be submerged in the pressure suppression pool above the uppermost horizontal vent on the drywell side of the drywell-wetwell boundary. By so locating the bleedline outlet, the pressure difference between the higher pressure in the drywell and the lower pressure in the wetwell is used to drive any residual, noncondensed steam and any noncondensibles from the containment condenser and into the wetwell. The condensate is normally recycled back to the RPV.

In traditional BWRs, the movement of cooling water to remove decay or excess heat in emergency situations was effected as a result of forced circulation by electric- or diesel-powered water pumps. However, inasmuch as such pumps may fail at a critical time, newer BWRs feature passive- or natural-circulation emergency cooling without the use of active devices such as pumps or the like. With respect to flow from the containment to the containment condenser, natural circulation flow may be achieved by proper location of the condenser to make use as a motive force the pressure differentials that develop between the drywell and the wetwell.

Especially for passive- or natural-circulation emergency cooling systems, special consideration must be given to the presence of noncondensibles inside the containment condenser. In particular, noncondensibles may accumulate in the containment condenser and degrade the heat transfer to such an extent that decay or excess heat removal is not possible. Venting the noncondensibles and any residual, noncondensed steam from the containment condenser to the wetwell using the pressure differential between the drywell and wetwell provides a partial solution. However, the steam vented to the wetwell carries both specific and latent heat which will be transferred to an upper gaseous layer inside the wetwell. The higher temperature of the upper layer will increase the pressure inside the wetwell and ultimately inside the drywell. Noncondensibles in the condenser will not be transported to the wetwell through the ventline if the wetwell has a higher pressure than the drywell. The heat removal through the condensor will then deteriorate by the accumulation of noncondensibles and pressure in the drywell will increase through the continuing generation of steam caused by the decay heat. Heat transfer will only resume after the pressure in the drywell exceeds that in the wetwell and the noncondensibles have been vented to the wetwell. Inasmuch as there is no passive means to cool the wetwell, the pressure will remain high unless active cooling systems are provided. Thus it may been seen that there remains a need for an improved emergency cooling system for nuclear BWRs.

BROAD STATEMENT OF THE INVENTION

The present invention is directed to an improved emergency cooling system method for nuclear BWRs. By providing for improved heat transfer between a containment condenser which receives a heat transfer fluid and noncondensibles in the gaseous phase from the RPV and a water pool vented to the environment outside the containment structures of the BWR, the instant invention is able to efficiently remove excess or decay heat from the reactor core contained in the RPV during a LOCA to ensure the structural integrity of the containment structures surrounding the BWR in the event of an emergency situation. The improved heat transfer is effected by the enhanced removal from the containment condenser of noncondensibles which impede heat transfer. Moreover, the enhanced removal of noncondensibles from the containment condenser allows these noncondensibles and any noncondensed steam to be vented into the drywell of the BWR instead of to the wetwell. Consequently, the vacuum breaker check valve between the drywell and the wetwell, as well as active cooling systems for the wetwell, may be eliminated.

It is, therefore, an object of the instant invention to provide for an improved emergency cooling system for nuclear BWRs. The improved emergency cooling system may be especially adapted for incorporation into a nuclear BWR wherein a reactor pressure vessel containing a nuclear core and a heat transfer fluid for circulation in heat transfer relationship with the core is housed within an annular sealed drywell and is fluid communicable therewith for passage thereto in an emergency situation the heat transfer fluid in a gaseous phase and any noncondensibles present in the RPV, an annular sealed wetwell houses the drywell, and a pressure suppression pool of liquid is disposed in the wetwell and is connected to the drywell by submerged vents. The improved emergency cooling system has a containment condenser for receiving condensible heat transfer fluid in a gaseous phase and noncondensibles for condensing at least a portion of the heat transfer fluid. The containment condenser has an inlet in fluid communication with the drywell for receiving from the drywell heat transfer fluid in a gaseous phase and noncondensibles, a first outlet in fluid communication with the RPV for the return to the RPV of the condensed portion of the heat transfer fluid and a second outlet in fluid communication with the drywell for passage to the drywell of the noncondensed balance of the heat transfer fluid and the noncondensibles. The noncondensed balance of the heat transfer fluid and the noncondensibles passed to the drywell from the containment condenser are mixed with the heat transfer fluid in the gaseous phase and the noncondensibles from the RPV for passage into the containment condenser. The improved emergency cooling system also has a water pool in heat transfer relationship with the containment condenser and thermally communicable in an emergency situation with an environment outside of the drywell and the wetwell for conducting heat transferred from the containment condenser away from the wetwell and the drywell.

In one embodiment of the invention, the improved heat transfer and enhanced noncondensible flow from the containment condenser is effected by providing the containment condenser with a shroud defining a plenum in fluid communication with the first outlet and a plurality of tubes for passage therethrough of the heat transfer fluid in a gaseous phase and the noncondensibles from the drywell. The tubes may extend in fluid communication with a steam dome connected to the inlet and have annular centers and inner surfaces. At least a portion of the heat transfer fluid may condense in the tubes and flow through the tubes along the inner surfaces. The tubes may be oriented at an angle from between 20° and 40° with respect to vertical so that condensate will collect on one side of the tubes, making the condensate thinner along the rest of the tube and thereby increasing the heat transfer rate from the containment condenser to the surrounding water pool. Flowtrips may be incorporated into the tubes adjacent the plenum for dropletizing the condensed portion of the heat transfer fluid flowing along the inner surfaces of the tubes. Dropletizing increases the shear between the condensate and the noncondensibles and thereby dragging the noncondensibles out of the tubes.

In another embodiment of the invention, the improved heat transfer and enhanced noncondensible flow from the containment condenser is effected by providing the containment condenser with a shroud defining a plenum in fluid communication with the first outlet and a plurality of vertical tubes for passage therethrough of the heat transfer fluid in a gaseous phase and the noncondensibles from the drywell. The tubes may extend in fluid communication with a steam dome connected to the inlet and have annular centers and inner surfaces. At least a portion of the heat transfer fluid may condense in the tubes and flow through the tubes along the inner surfaces. Flowtrips may be incorporated into the tubes for dropletizing the condensed portion of the heat transfer fluid flowing along the inner surfaces of the tubes and for directing the droplets produced by the dropletizing to the annular centers of the tubes.

It is also an object of the invention to provide a method for cooling a nuclear BWR in the event of an emergency situation. The method is especially suited for nuclear BWRs wherein a reactor pressure vessel (RPV) containing a nuclear core and a heat transfer fluid for circulation in heat transfer relationship with the core is housed within an annular sealed drywell and is fluid communicable therewith for passage thereto in an emergency situation the heat transfer fluid in a gaseous phase and any noncondensibles present in the RPV, and annular sealed wetwell houses the drywell, and a pressure suppression pool of liquid is disposed in the wetwell and is connected to the drywell by submerged vents. Heat transfer fluids are evaporated by the decay heat of the reactor core placed in the RPV. The vaporized fluids will flow into the drywell via a vent connected to the RPV that is opened upon detection of a LOCA.

Therefore, in its preferred embodiment, the method includes passing at least a portion of the heat transfer fluid and the noncondensibles from the RPV into the drywell for mixing with heat transfer fluid and noncondensibles from a later step of the method. The mixed heat transfer fluids and noncondensibles are then passed from the drywell and through a containment condenser for condensing at least a portion of the heat transfer fluid. The condensed heat transfer fluid is returned to the RPV. The noncondensed balance of the heat transfer fluid and the noncondensibles are returned to the drywell wherein they are mixed with the heat transfer fluid and the noncondensibles from the RPV for passage into the containment condenser.

In one embodiment of the instant method, the containment condenser is provided with a shroud defining a plenum in fluid communication with the RPV and a plurality of tubes for passage therethrough of the heat transfer fluid the noncondensibles from the drywell. The tubes may extend in fluid communication with a steam dome in fluid communication with the drywell and have annular centers and inner surfaces. At least a portion of the heat transfer fluid may condense in the tubes and flow through the tubes along the inner surfaces. The tubes may be oriented at an angle from between 20° and 40° with respect to vertical so that condensate will collect on one side of the tubes, making the condensate thinner along the rest of the tube and thereby increasing the heat transfer rate from the containment condenser to the surrounding water pool. Flowtrips may be incorporated into the tubes adjacent the plenum for dropletizing the condensed portion of the heat transfer fluid flowing along the inner surfaces of the tubes. Dropletizing increases the shear between the condensate and the noncondensibles and thereby dragging the noncondensibles out of the tubes.

In another embodiment of the instant method, the containment condenser is provided with a shroud defining a plenum in fluid communication with the RPV and a plurality of vertical tubes for passage therethrough of the heat transfer fluid and the noncondensibles from the drywell. The tubes may extend in fluid communication with a steam dome in fluid communication with the drywell and have annular centers and inner surfaces. At least a portion of the heat transfer fluid may condense in the tubes and flow through the tubes along the inner surfaces. Flowtrips may be incorporated into the tubes for dropletizing the condensed portion of the heat transfer fluid flowing along the inner surfaces of the tubes and for directing the droplets produced by the dropletizing to the annular centers of the tubes.

These and other objects, features and advantages of the instant invention will be readily apparent to those skilled in the art based upon the disclosure contained herein.

The drawings will be described further in connection with the following Detailed Description of the Invention.

DETAILED DESCRIPTION OF THE INVENTION

Figure 1:
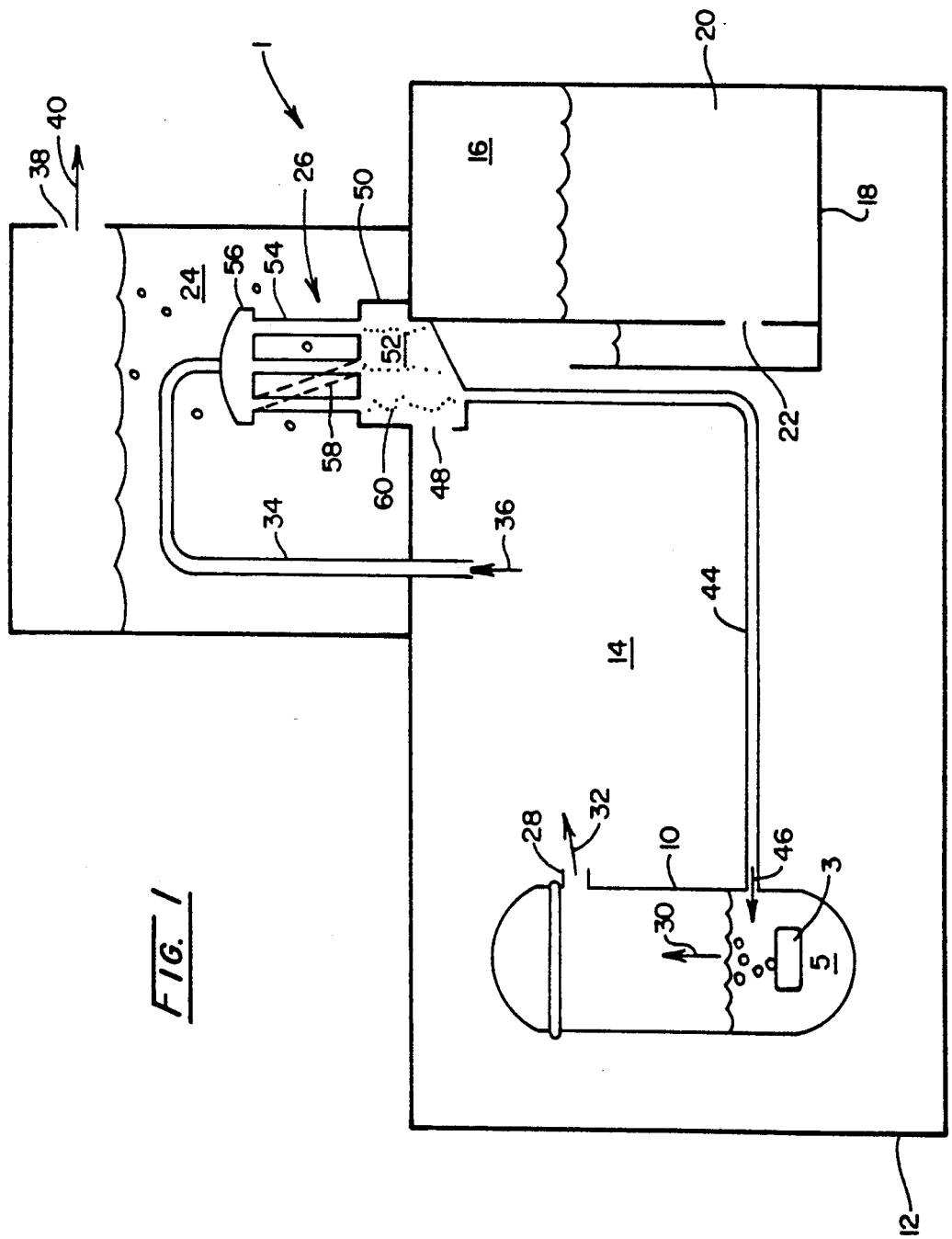
FIG. 1 is a simplified schematic diagram of nuclear BWR system having an emergency cooling system according to the instant invention.

Referring initially to FIG. 1, a nuclear BWR system is shown generally at 1. Reactor 10 containing a core, 3, and working fluid, 5, can be seen to be housed within reactor containment 12 which also defines drywell 14. Working fluid 5 generally consists of liquid water which is vaporized upon circulation in a heat transfer relationship with core 3 and passed via a main steam line to a turbine (not shown). Additionally, reactor 10 may contain gaseous noncondensibles, such as inert gases and the like. Also housed within containment 12 is wetwell 16 which is also defined by wall 18. Annular pressure suppression pool 20 is contained within wetwell 16 and connects drywell 14 and wetwell 16 via vent 22. Disposed outside of containment 12 is upper pool 24 which contains a containment condenser, shown generally at 26. Alternatively, containment condenser 26 may be disposed within containment 12.

With respect to implementation of the emergency cooling system that is the subject of the instant invention, reactor 10 may be seen to be communicable in a postulated emergency situation with drywell 14 via vent 28. In a postulated LOCA or other emergency situation wherein the main steam line from the reactor is closed or steam flow therethrough is reduced, a gaseous-phase steam and noncondensible mixture will flow from reactor 10 into drywell 14 upon the actuation of vent 28. The direction of the emergency situation flow from reactor 10 into drywell 14 is as represented by arrows 30 and 32. As the gaseous steam and noncondensibles released from reactor vessel 10 may result in a sudden increase in pressure in drywell 14, pressure suppression pool 16 is provided to dampen such transitory phenomena and thereby ensure the structural integrity of containment 12 such that no radioactive materials are released to the environment.

When the pressure in drywell 14 exceeds that in containment condenser 26, the gaseous steam and noncondensible mixture will flow from drywell 14 into containment condenser 26 via line 34 as represented by arrow 36. At least a portion of the latent and specific heats of the steam and noncondensible mixture are removed from drywell 14 via transfer to upper pool 26 and exhaustion through vent 38 as represented by arrow 40. The heat transfer from the steam and noncondensible mixture to upper pool 24 via containment condenser 26 results in the condensation of at least a portion of the steam component of the steam and noncondensible mixture passed through containment condenser 26. Condensate is passed from containment condenser 26 to reactor 10 via line 44 as represented by arrow 46. The noncondensed balance of the steam and noncondensible mixture is returned to drywell 14 via outlet 48. Upon return to drywell 14, the noncondensed balance is mixed with the steam and noncondensible mixture passed from reactor 10 to drywell 14. The steam added to drywell 14 via vent 28 from reactor 10 coupled with temperature differentials and condensation in containment condenser 26 will result in the development of a recirculation flow to containment condenser 26 via line 34.

With continued reference to FIG. 1, the advantages of the instant invention are revealed upon a closer examination of containment condenser 26. Containment condenser 26 may be seen to comprise a shroud, 50, defining a plenum, 52, in fluid communication with outlet 48 and a plurality of vertical tubes, 54, for passage therethrough of the steam and noncondensible mixture. Tubes 54, which may be linear or helical coils, may be seen to extend in fluid communication with a steam dome, 56, connected to drywell 14 via line 34.

At least a portion of the steam component of the steam and noncondensible mixture may condense in tubes 54 and flow therethrough along their inner surfaces. As the condensate is passed from tubes 54 into plenum 52, the shear effect on the noncondensible component of the steam and noncondensible mixture is increased. This increased shear and the higher density of the noncondensibles compared to steam, in effect, drag the noncondensibles out of containment condenser 26. Inasmuch as the heat transfer in containment condenser 26 is governed by the diffusion of steam vapor molecules through a noncondensible layer to a laminar condensate film flowing on the inner surfaces of tubes 54, the presence of noncondensibles in containment condenser 26 may be seen as an impediment to the removal of heat form containment 12. By providing for the removal of noncondensibles from containment condenser 26, the heat transfer between upper pool 24 and containment condenser 26 is enhanced. Moreover, as there is no accumulation of noncondensibles in containment condenser 26, the need for a vent line from containment condenser 26 to suppression pool 20 is eliminated. Instead, the noncondensibles and any noncondensed steam may be vented directly into drywell 14. Consequently, the vacuum breaker check valve between drywell 14 and wetwell 16, and the active cooling systems for wetwell 16, normally associated with emergency cooling systems also become superfluous.

Alternatively, as shown at 58, tubes 54 may be oriented at an angle from between about 20° and 40° with respect to vertical. Orientation at such inclination allows condensate to collect on one side of the inner surfaces of tubes 54, making the condensate thinner along the rest of the tube and thereby increasing the heat transfer rate from containment condenser 26 to upper pool 24. Preferably, the length of plenum 52 is about twice the length of tubes 54.

Advantageously, flowtrips may be incorporated into tubes 54. Flowtrips may be used to dropletize (i.e., the formation of liquid dropelets) the condensate (shown generally at 60) flowing along the inner surfaces of tubes 54. Dropletizing increases the shear between the condensate and the noncondensibles and thereby enhances the dragging of the noncondensibles out of tubes 54 and containment condenser 26. For vertical tubes 54, flowtrips may be incorporated into the tubes at a preferred spacing of between about 20-50 hydraulic diameters. For slanted tubes 58, flowtrips may be incorporated into the tubes adjacent plenum 52.

Figure 2:
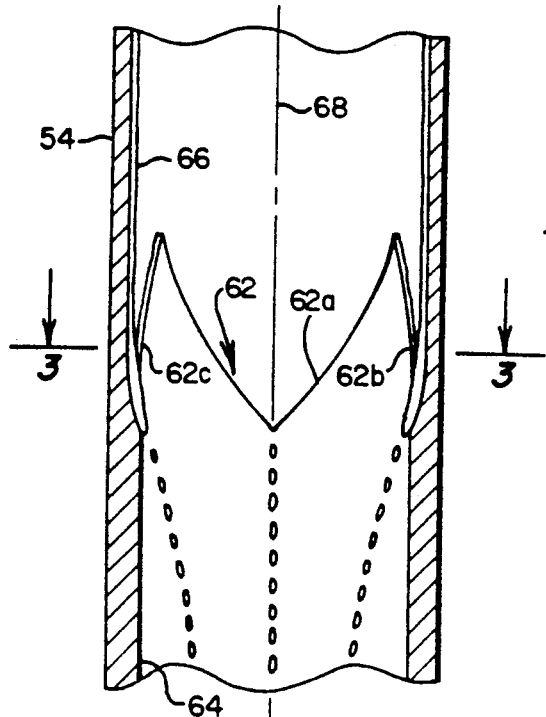
FIG. 2 is an elevational cross-sectional view taken through reference line 2—2 of FIG. 3 of one embodiment of a flow trip according to the instant invention.

Referring to FIGS. 2-5, possible embodiments of flowtrips according to the instant invention are shown. Referring to FIG. 2 initially, a flow trip is shown as comprising a cylindrical channel, 62, circumscribed into the inner surface 64 of tube 54 and terminating into generally V-shaped flutes, 62a-c. Condensate 66 flowing down channel 62 of tube 54 is tripped by flutes 62a-c, dropletized, and directed towards annular center 68 of tube 54. Looking to FIG. 3, it may been seen that flutes 62a-c terminating channel 62 may be equilaterally spaced about inner surface 64 of tube 54.

Figure 4:
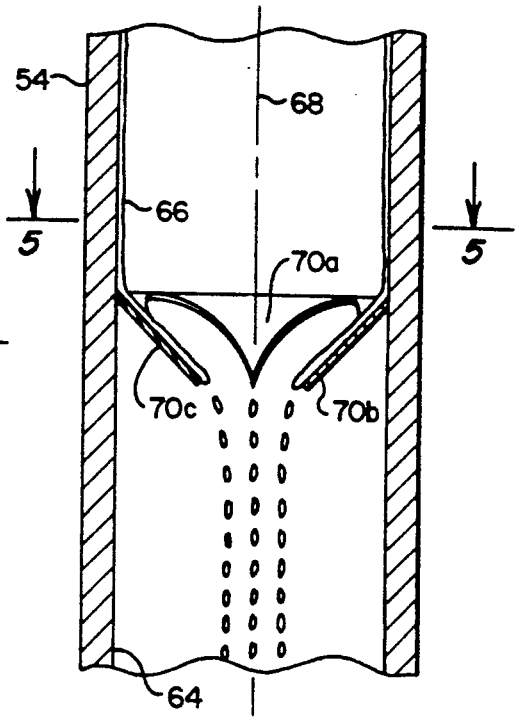
FIG. 4 is an elevational cross-sectional view taken through reference line 4—4 of FIG. 5 of another embodiment of a flow trip according to the instant invention.
Figure 3:
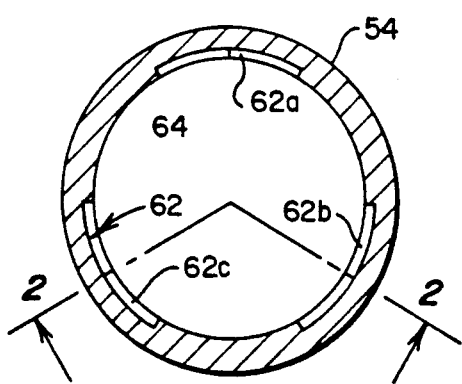
FIG. 3 is a cross-sectional view taken through reference line 3—3 of FIG. 2 of one embodiment of a flowtrip according to the instant invention.
Figure 5:
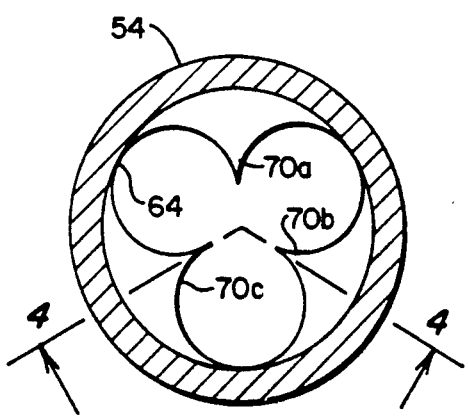
FIG. 5 is a cross-sectional view taken through reference line 5—5 of FIG. 4 of another embodiment of a flowtrip according to the instant invention.

Turning to FIG. 4, another embodiment of a flowtrip according to the instant invention is shown as comprising three, equilateral-spaced fins, 70a-c. As may be seen in connection with FIG. 5, fins 70a-c may extend from inner surface 64 of tube 54 towards annular center 68. Fins 70a-c may be acutely angled with respect to inner surface 64 of tube 54. Condensate 66 flowing down inner surface 64 of tube 54 is tripped by fins 70a-c, dropletized, and directed towards annular center 68 of tube 54.

As to materials of construction, preferably all components are manufactured from materials appropriate for their use within a nuclear BWR. Further, it will be appreciated that various of the components shown and described herein may be altered or varied in accordance with the conventional wisdom in the field and certainly are included within the present invention, provided that such variations do not materially vary within the spirit and precepts of the present invention as described herein.

We claim:

1. In a nuclear boiling water reactor (BWR) facility wherein housed within a sealed annular drywell is a reactor pressure vessel (RPV) which contains a nuclear core and a condensible heat transfer fluid for circulation in heat transfer relationship with said core, and which is fluid communicable in an emergency situation with said drywell for passage thereinto of gaseous phase heat transfer fluid and any noncondensibles in said RPV; an annular sealed wetwell which houses said drywell; and a pressure suppression pool of liquid which is disposed in said wetwell and is connected to said drywell by submerged vents, an improved emergency cooling system which comprises:

(a) a containment condenser (i) having an inlet in fluid communication with said drywell for receiving condensible gaseous phase heat transfer fluid and noncondensibles therefrom for the condensation of at least a portion of said heat transfer fluid;

(ii) a first outlet in fluid communication with said RPV for the return to said RPV of the condensed portion of said heat transfer fluid; and (iii) a second outlet in fluid communication with said drywell for passage to said drywell of the noncondensed balance of said heat transfer fluid and said noncondensibles; and (b) a water pool in heat transfer relationship with said containment condenser for conducting heat away from said containment condenser.

2. The improved emergency cooling system of claim 1, wherein said containment condenser additionally comprises:

(iv) a shroud defining a plenum which is in fluid communication with said first outlet;

(v) a steam dome;

(vi) and a plurality of tubes running from said steam dome to said plenum for passage therethrough of said gaseous phase heat transfer fluid and said noncondensibles from said drywell, said tubes having annular centers and inner surfaces, at least a portion of said heat transfer fluid condensing in said tubes and flowing through said tubes along said inner surfaces.

3. The improved emergency emergency cooling system of claim 2, wherein said tubes are disposed at an angle of from between about 20° and 40° with respect to vertical.

4. The improved emergency cooling system of claim 2, wherein said tubes are disposed vertically.

5. The improved emergency cooling system of claim 2, wherein said tubes are linear.

6. The improved emergency cooling system of claim 2, wherein said tubes are helical coils.

7. The improved emergency cooling system of claim 2, wherein the length of said plenum is about twice the length of said tubes.

8. The improved emergency cooling system of claim 4, wherein flowtrips are incorporated into said tubes for dropletizing the condensed portion of said heat transfer fluid flowing through said tubes along said inner surfaces and for directing the droplets produced by said dropletizing to said annular centers of said tubes.

9. The improved emergency cooling system of claim 8, wherein said flowtrips are fins which extend inwardly from said inner surfaces of said tubes.

10. The improved emergency cooling system of claim 8, wherein said flowtrips are a plurality of V-shaped flutes terminating a cylindrical channel circumscribed into said inner surfaces of said tubes.

11. The improved emergency cooling system of claim 3, wherein flowtrips are incorporated into said tubes adjacent said shroud for dropletizing the condensed portion of said heat transfer fluid flowing through said tubes along said inner surfaces.

12. The improved emergency cooling system of claim 11, wherein said flowtrips are fins which extend inwardly from said inner surfaces of said tubes.

13. The improved emergency cooling system of claim 11, wherein said flowtrips are a plurality of V-shaped flutes terminating a cylindrical channel circumscribed into said inner surfaces of said tubes.

14. The improved emergency cooling system of claim 1, wherein said heat transfer fluid and said noncondensibles are passed from said RPV to the drywell and then through said containment condenser by negative pressure differentials.

15. A method for removing heat from a reactor pressure vessel (RPV) in emergency cooling situations, said RPV being part of a nuclear boiling water reactor (BWR) facility wherein housed within a sealed annular drywell is said reactor pressure vessel (RPV) which contains a nuclear core and a condensible heat transfer fluid for circulation in heat transfer relationship with said core, and which is fluid communicable in an emergency situation with said drywell for passage thereinto of gaseous phase heat transfer fluid and any noncondensibles in said RPV; an annular sealed wetwell which houses said drywell; and a pressure suppression pool of liquid which is disposed in said wetwell and is connected to said drywell by submerged vents, which comprises:
(a) passing at least a portion of said heat transfer fluid and said noncondensibles from said RPV into said drywell for mixing with heat transfer fluid and noncondensibles from a later step of the method;
(b) passing the mixed heat transfer fluids and noncondensibles from said drywell through a containment condenser for condensing at least a portion of the heat transfer fluid;
(c) passing the condensed heat transfer fluid of step (b) from said containment condenser to said RPV;
(d) passing the noncondensed balance of the heat transfer fluid and the noncondensibles of step (b) into said drywell for mixing in step (a) with said heat transfer fluid and said noncondensibles from said RPV.

16. The method of claim 15 wherein said containment condenser is provided to comprise:
a shroud defining a plenum which is in fluid communication with said RPV;
a steam dome;
and a plurality of tubes running from said stream dome to said plenum for passage therethrough in step (b) of said mixed heat transfer fluids and noncondensibles from said drywell, said tubes having annular centers and inner surfaces, at least a portion of the heat transfer fluid condensing in said tubes and flowing through said tubes along said inner surfaces.

17. The method of claim 16, wherein said tubes are disposed at an angle of from between about 20° and 40° with respect to vertical.

18. The method of claim 16, wherein said tubes are disposed vertically.

19. The method of claim 16, wherein said tubes are provided to be linear.

20. The method of claim 16, wherein said tubes are provided as helical coils.

21. The method of claim 16, wherein the length of said plenum is provided to be about twice the length of said tubes.

22. The method of claim 18, wherein flowtrips are incorporated into said tubes for dropletizing the condensed portion of the heat transfer fluid flowing through said tubes along said inner surfaces and for directing the droplets produced by said dropletizing to said annular centers of said tubes.

23. The method of claim 22, wherein said flowtrips are provided as fins which extend inwardly from said inner surfaces of said tubes.

24. The method of claim 22, wherein said flowtrips are a plurality of V-shaped flutes terminating a cylindrical channel circumscribed into said inner surfaces of said tubes.

25. The method of claim 17, wherein flowtrips are incorporated into said tubes adjacent said shroud for dropletizing the condensed portion of the heat transfer fluid flowing through said tubes along said inner surfaces.

26. The method of claim 25, wherein said flowtrips are provided as fins which extend inwardly from said inner surfaces of said tubes.

27. The method of claim 25, wherein said flowtrips are a plurality of V-shaped flutes terminating a cylindrical channel circumscribed into said inner surfaces of said tubes.

28. The method of claim 15 wherein in step (a), said heat transfer fluid and said noncondensibles from said RPV are passed into said drywell by negative pressure differentials.

29. The method of claim 15 wherein in step (b), said mixed heat transfer fluids and noncondensibles are passed from said drywell into said containment condenser by negative pressure differentials.

30. The method of claim 15 wherein a water pool is disposed in a heat transfer relationship with said containment condenser for conducting heat from said containment condenser.

* * * * *